United States Patent
Wang et al.

(10) Patent No.: US 8,745,051 B2
(45) Date of Patent: Jun. 3, 2014

(54) RESOURCE LOCATOR SUGGESTIONS FROM INPUT CHARACTER SEQUENCE

(75) Inventors: Yonggang Wang, Beijing (CN); Feng Hong, Foster City, CA (US); Wei Xu, Beijing (CN); Xiliu Tang, Beijing (CN); Henry Ou, Beijing (CN); Bo Yang, Beijing (CN); Lei Zhang, Beijing (CN); Runhua Yang, Beijing (CN); Jun Wu, Saratoga, CA (US); Baogang Yao, Kirkland, WA (US)

(73) Assignee: Google Inc., Mountain View, CA (US)

( * ) Notice: Subject to any disclaimer, the term of this patent is extended or adjusted under 35 U.S.C. 154(b) by 789 days.

(21) Appl. No.: 12/211,712

(22) Filed: Sep. 16, 2008

(65) Prior Publication Data

US 2010/0005086 A1 Jan. 7, 2010

Related U.S. Application Data

(60) Provisional application No. 61/078,157, filed on Jul. 3, 2008.

(51) Int. Cl.
*G06F 7/00* (2006.01)
*G06F 17/30* (2006.01)

(52) U.S. Cl.
USPC .......................................... 707/736; 707/708

(58) Field of Classification Search
None
See application file for complete search history.

(56) References Cited

U.S. PATENT DOCUMENTS

| | | | |
|---|---|---|---|
| 5,885,081 A * | 3/1999 | Tamura et al. | 434/169 |
| 6,407,754 B1 * | 6/2002 | Hetherington et al. | 715/765 |
| 7,720,856 B2 * | 5/2010 | Goedecke et al. | 707/759 |
| 2002/0152258 A1 | 10/2002 | Zhou | |
| 2005/0086590 A1 * | 4/2005 | Lee et al. | 715/505 |
| 2006/0241933 A1 * | 10/2006 | Franz | 704/2 |
| 2007/0106653 A1 * | 5/2007 | Sun | 707/4 |
| 2007/0203894 A1 * | 8/2007 | Jones et al. | 707/3 |
| 2007/0255702 A1 * | 11/2007 | Orme | 707/5 |
| 2009/0024613 A1 * | 1/2009 | Niu et al. | 707/5 |
| 2009/0144049 A1 * | 6/2009 | Haddad et al. | 704/3 |

FOREIGN PATENT DOCUMENTS

| | | | |
|---|---|---|---|
| CN | 1496062 | A | 5/2004 |
| CN | 1770147 | A | 5/2005 |
| CN | 101084500 | A | 12/2007 |
| CN | 101203849 | A | 6/2008 |
| JP | 2002024246 | A | 1/2002 |
| JP | 2002032278 | A | 1/2002 |
| JP | 2002032413 | A | 1/2002 |
| JP | 2002082850 | A | 3/2002 |

OTHER PUBLICATIONS

PCT/CN2009/072610, International Search Report, mailed Oct. 15, 2009, 10 pages.
International Preliminary Report on Patentability and Written Opinion for PCT Application No. PCT/CN2009/072610, mailed Jan. 13, 2011, 6 pages.

* cited by examiner

*Primary Examiner* — Cheryl Lewis
*Assistant Examiner* — Raheem Hoffler
(74) *Attorney, Agent, or Firm* — Remarck Law Group PLC

(57) ABSTRACT

Methods, systems, and apparatus, including computer program products, in which an input method editor receives Roman character inputs, identifies keywords for candidate sets of a non-Roman character, and identifies an associated resource location. Upon identifying an associated resource location, associating the resource location with the candidate set of non-Roman characters.

19 Claims, 6 Drawing Sheets

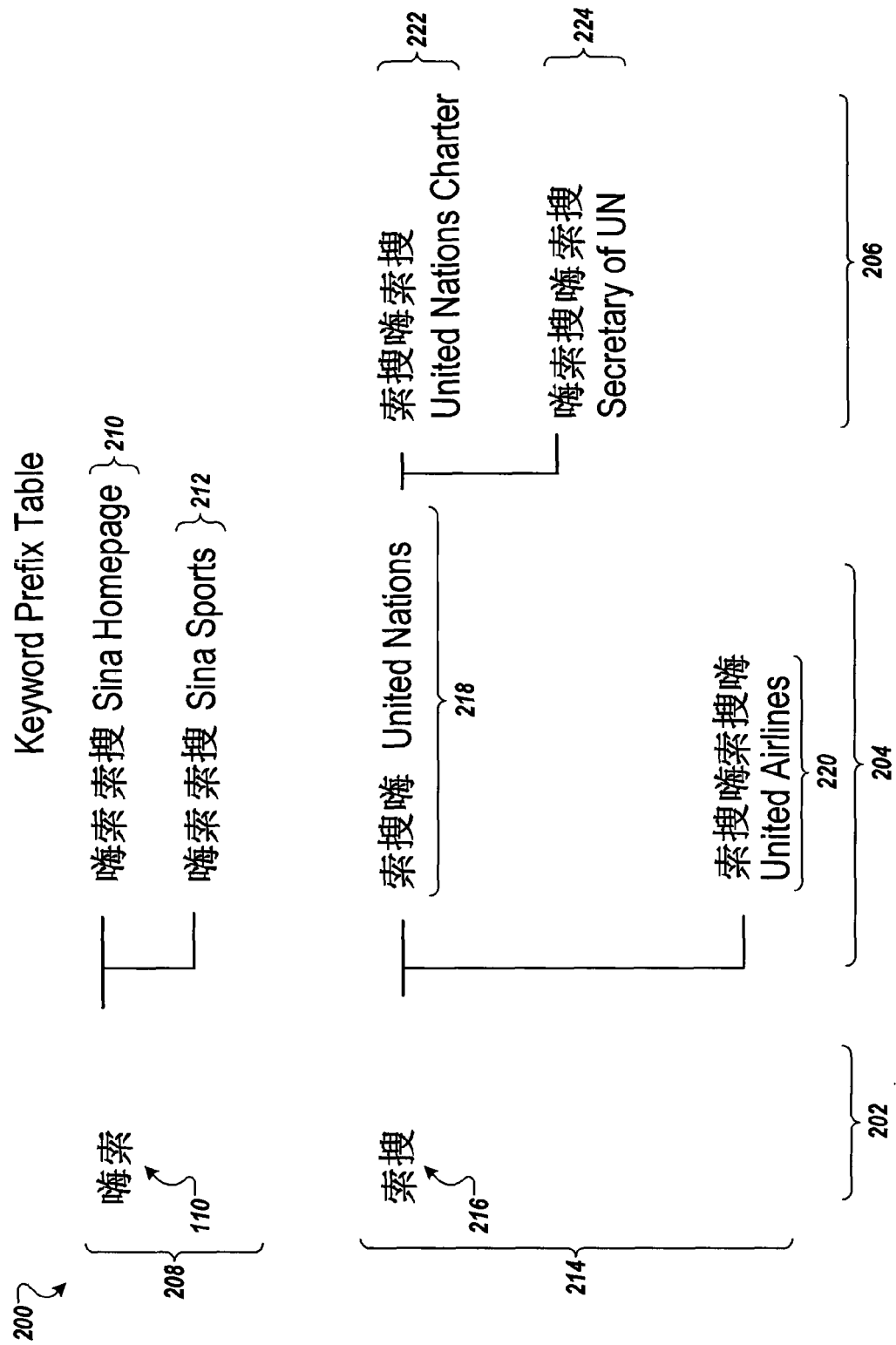

RESOURCE LOCATOR SUGGESTIONS FROM INPUT CHARACTER SEQUENCE

CROSS-REFERENCE TO RELATED APPLICATION

This application claims the benefit under 35 U.S.C. §119(e) of the filing date of U.S. Patent Application No. 61/078,157, filed Jul. 3, 2008, and entitled "Resource Locator Suggestions From Input Character Sequence," the contents of which are incorporated herein by reference.

BACKGROUND

This disclosure relates to input methods.

Languages that use a logographic script in which one or two characters correspond roughly to one word or meaning have more characters than keys on a standard input device, such as a computer keyboard or a mobile device keypad. For example, the Chinese language contains tens of thousands of characters having pronunciations defined by base Pinyin elements and five tones. The mapping of these potentially many-to-one associations can be implemented by input methods that facilitate entry of characters and symbols not found on input devices. Accordingly, a Roman character style keyboard can be used to input Chinese characters. Likewise, input methods can be used for using a Roman character style keyboard or some other input device to input many other languages that include ideograms, such as the Japanese language, the Korean language, and other languages.

Despite the availability of input method editors, addresses of Internet sites, e.g., uniform resource locators ("URLs") are often in the form of ASCII characters. Thus, users whose native language is based on a logographic script, e.g., users that primarily speak a Chinese dialect, have difficulty remembering the URLs of web sites, even though they know the literal names of the websites in their languages. Accordingly, these users must take several separate steps to input the URLs of web sites they desire to view. The literal names associated with the URLs can be spelled in the users' languages using the ideographic characters of their languages. As ideographic characters are not directly input by use of Western-style keyboards, input method editors are used to accomplish the conversion from Roman character phonetic inputs (e.g., Pinyin) to candidate ideograph characters (e.g., Hanzi). Thereafter, the ideographic characters are used by a search engine to find potential web site desired by the users, and the users select the web sites if the web sites appear in the resultant search results.

SUMMARY

This specification describes technologies related to input method editors. In some implementations, resource locations, e.g., URLs, can be found directly from phonetic inputs, e.g., Pinyin inputs, input in an address bar of a web browser. User inputs in Roman characters are received in an address bar in a web browser and are converted to candidate sets of non-Roman characters, e.g., candidate sets of Hanzi characters. Each set of non-Roman characters is used as a keyword prefix to identify keywords. The keywords are associated with URLs and the URLs and associated keywords are displayed for each associated candidate set of non-Roman characters when that candidate set is selected.

In general, one aspect of the subject matter described in this specification can be embodied in methods that include the actions of receiving Roman character inputs; using the Roman character inputs to identify candidate sets of non-Roman characters; identifying candidate sets of resource locations, each candidate set of resource locations associated with a corresponding candidate set of non-Roman characters; and providing the candidate sets of resource locations and the candidate sets of non-Roman characters to a user interface for display. Other embodiments of this aspect include corresponding systems, apparatus, and computer program products.

Another aspect of the subject matter described in this specification can be embodied in methods that include the actions of identifying keywords from queries in a query log; generating a mapping of the keywords to resource locations, each resource location being a location that was selected by a user in response to a search that included the keyword to which the location is mapped; generating a mapping of prefixes to keywords; and providing the mapping of prefixes to keywords and the mapping of the keywords to resource locations to a client device for use in resolving resource location addresses at the client device. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A illustrates an example keyword prefix table.

Like reference numbers and designations in the various drawings indicate like elements.

DETAILED DESCRIPTION

Figure 1:
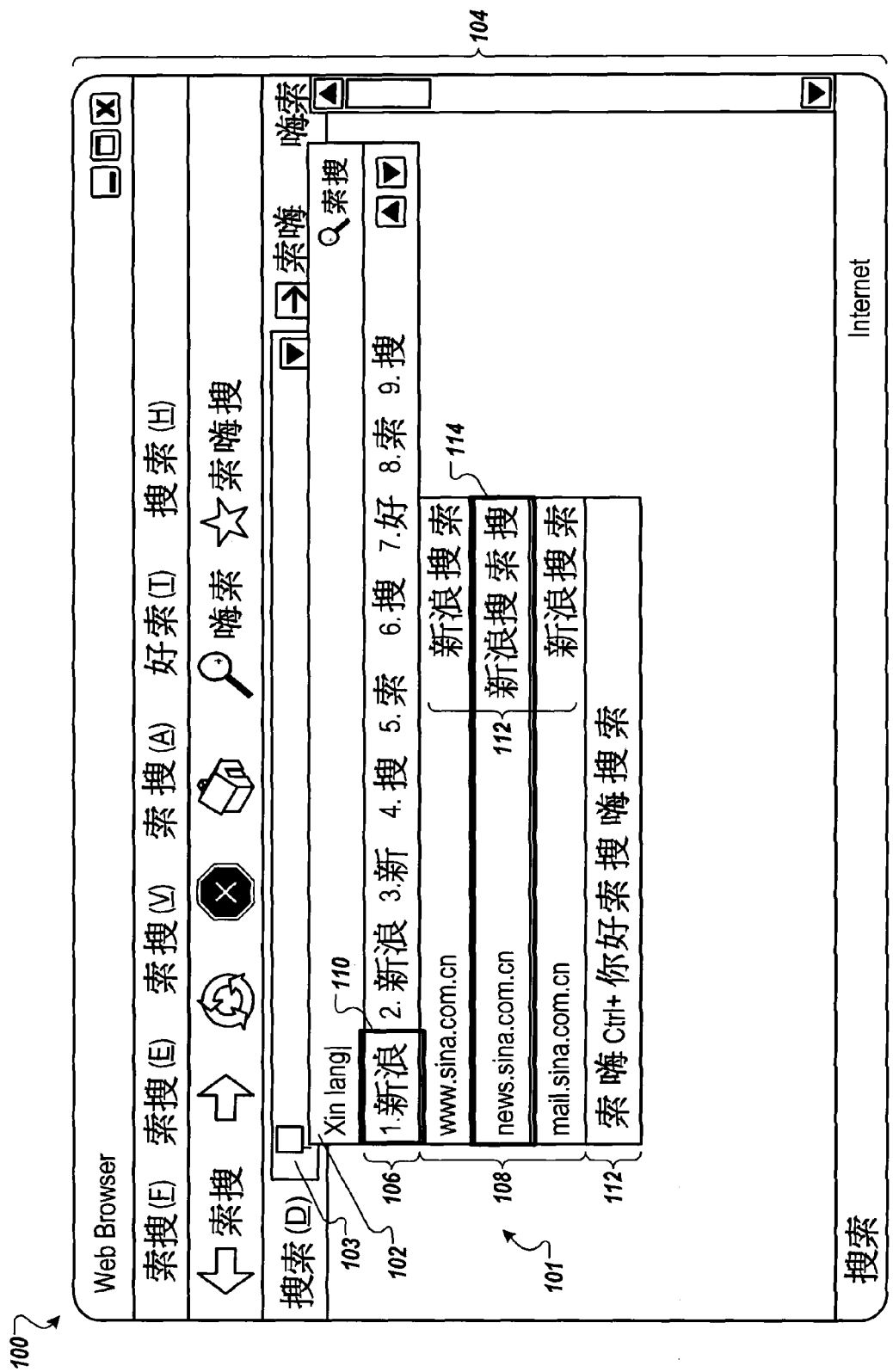
FIG. 1 is a screenshot illustrating an example web browser environment in which resource locations are identified from input method editor inputs.

FIG. 1 is a screenshot 100 illustrating an example web browser environment 104 in which resource locations are identified from input method editor inputs. The address bar 103 is integrated with IME address environment 101. In some implementations, the address bar 103 may function as a standard URL input bar in which a user can enter a web address, e.g., www.example.com. In some implementations, the input method editor inputs are provided to an IME address environment 101 in which Roman characters (e.g., ASCII characters for Pinyin inputs) entered into an IME address bar 102 are converted into non-Roman characters (e.g., Hanzi characters). In some implementations, the Roman character input represents a phonetic representation of one or more candidate sets of logographic text, such as a Pinyin representation of Hanzi characters. The IME address environment 101 can use the entered text to automatically locate uniform resource locators (URLs), and can suggest one or more user-selectable URL results pertaining to the Roman character inputs.

Although the address bar 103 and the IME address bar 102 are shown as separate address bars, the IME address bar can be integrated into the address bar 103. Furthermore, the IME address environment 101 can be instantiated either automatically or manually. Automatic instantiation can occur when a user enters Roman characters that correspond to phonetic inputs, e.g., "Xin" and that also do not correspond to standard resource location addresses, e.g. "www.example.com." Manual instantiation can occur in response to a specific command, e.g., a keyboard or menu command, input by the user.

The conversion from Roman characters to non-Roman characters and identification of URLs provides users who generally read and write using Hanzi, or other language that uses ideographic characters, convenient identification of URLs without having to remember the URL. The IME address environment 101 provides IME processing capabilities that can receive Roman character inputs and convert the Roman character inputs into non-Roman characters. In some implementations, these non-Roman characters correspond to keywords that are mapped to URLs.

For example, a user can enter the Pinyin inputs "xin lang" into the IME address bar 102 of the IME address environment 101, and the Pinyin inputs can be converted into candidate sets of non-Roman characters 106. These candidate sets of non-Roman characters 106 are, in some implementations, keyword prefixes of keywords 112 in the non-Roman characters. The keywords 112 are identified by the keyword prefixes 106, and thus the keyword prefixes 106 can be used to identify the corresponding URLs 108.

Selection of each candidate set of non-Roman characters 106 can thus cause the corresponding keywords 112 and URLs 108 to be displayed, as illustrated in FIG. 1, which shows the selection of a first candidate character set "新浪" and corresponding candidate URLs 108 and keywords 112. Selection of another candidate character set 106 would, in turn, cause another candidate set of URLs 108 and keyword 112 to be displayed. A user may utilize an input device, e.g., keyboard or a mouse, to select one of the URLs, as illustrated by the selection box 202 surrounding the second URL 108 ("news.sina.com.cn") and its corresponding keyword 112.

Although nine candidate sets of non-Roman characters 106 are shown, more or less sets of non-Roman characters can be displayed. Likewise, more or less candidate sets of resource locations 108 and keywords 112 can also be shown in response to selection of a candidate set of non-Roman characters.

In some implementations, the resource locations in each candidate set 108 can be ranked according to, for example, popularity of a particular resource location or keywords. The resource locations 108 and associated keywords 112 can, for example, be provided in a pre-ranked order according to selection frequencies based click logs and query logs, and/or based on rankings of the keywords in query logs. In some implementations, the data defining the resource locations 108, the keywords 112 and the corresponding rankings can be provided to a user device, and the rankings can be modified based on the selection history of the user(s) of the user device. For example, the IME address environment 101 can track a number of times each resource location has been selected by the current user(s) of the user device, and adjust the rankings the resource locations accordingly. The ranking can be used to output the list of resource locations 108 in a particular preferred order based on popularity of the resource location to the user(s) of the user device, for example. In a similar fashion, the order in which the candidate characters 106 are displayed may be adjusted based on selections by user(s) of the user device.

In some implementations, the mappings of keywords 112 to candidate character sets 106 can be provided in a data structure, such as a keyword prefix table. FIG. 2A illustrates an example keyword prefix table 200. In some implementations, the table 200 can be created by an external server and provided to a web browser on a client device. The keyword prefix table 200 includes a keyword prefix column 202, a keyword column 204, and a nested keyword column 206. The Roman characters are not included in the keyword prefix table, but are included in the illustration for ease of explanation.

A first row 208 includes the keyword prefix 110 that represents a Hanzi character for the term "Sina" in column 202. In an example, the keyword prefix 110 can be branched into two keywords including "Sina Homepage" 210 and "Sina Sports" 212. In some implementations, more keywords can be branched from a keyword prefix.

A second row 214 includes a keyword prefix 216 "United" along with the Hanzi character representing the keyword prefix "United" in column 202. In an example, the keyword prefix 216 can be branched into two keywords including "United Nations" 218 and "United Airlines" 220. The "United Nations" keyword 218 can be additionally branched into further keywords. For example, keyword 218 is shown branched into two more keywords including "United Nations Charter" 222 and "Secretary of UN" 224.

Figure 2B:
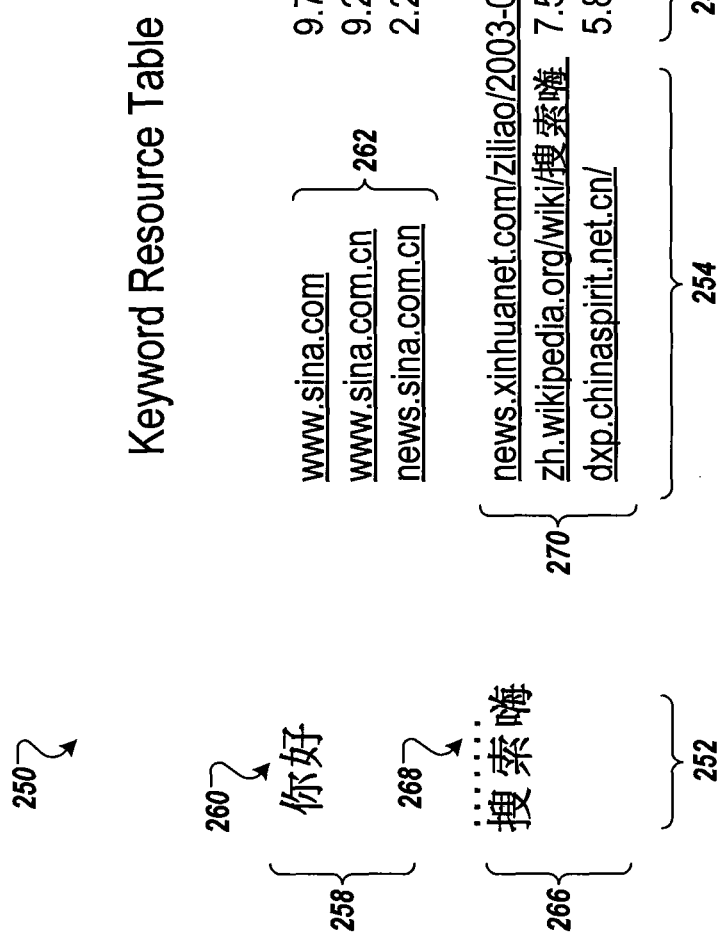
FIG. 2B illustrates an example keyword resource table.

The keywords in the table 200 can be mapped to resource locations. FIG. 2B illustrates an example keyword resource table 250. The keyword resource table 250 is a mapping between keywords and resource locations (such as uniform resource locators), and a ranking of the uniform resource locators according to a user preference, click rate, or other metrics. The table 200 can be created by an external server and provided to a web browser on a client device. In some implementations, the table 250 can be created by determining the frequency that each URL for each keyword is selected in response to a query that includes the keyword. These frequencies can, for example, be obtained by mining query logs and click logs associated with a search engine. The uniform resource locators are ranked for each of the keyword candidate sets relative to the other uniform resource locators based these frequencies.

The table 250 includes a character column 252, a URL column 254, and a ranking column 256. The character column 252 includes Hanzi characters. The characters represent keywords entered by users. The URL column 254 includes a proper subset of uniform resource locators that that have been selected in response to a query that includes the keyword Hanzi characters shown in column 252. The ranking column 256 includes a ranking score for each uniform resource location in column 254. The ranking is indicative of the relative frequency at which each uniform resource location is selected with respect to a corresponding keyword, and also determines the order in which the keywords and uniform resource locators are displayed to a user.

In one example, a row 258 includes a first keyword 260, related uniform resource locators 262, and rankings of the uniform resource locators 264. The top ranked uniform resource locator is "www.sina.com" and is scored at 9.75, while the lower uniform resource locators are ranked at 9.22 and 2.21, respectively. Thus, for the keyword represented by the characters 260, the most likely uniform resource locators that are to be selected are the three uniform resource locators 262. In a similar fashion, a row 266 displays a second keyword 268, related uniform resource locators 270, and rankings of the uniform resource locators 272.

These rankings can be initially set based on the mining of the query and click logs. In some implementations, the rankings in a particular table 250 on a client device can be adjusted based on user(s) inputs.

The tables 200 and 250 can be used by a web browser to select and display the resource locations 108 and corresponding keywords 112 in the IME address environment 101. For example, a client device that is running software that instantiates the IME address environment 101 can access the prefix table 200 to identify keywords based on the candidate character sets 106. These keywords can then be used as an index in the keyword location table 250 to identify the most popular resource locations for a selected candidate character set. For example, if the user were to input Pinyin that resulted in the identification of the keyword prefix "United," the IME address environment 101 would include the suggested keywords "United Nations" and "United Airlines" and the corresponding resource locations that are indexed in the keyword resource table 250. Further, the IME address environment 101 could also suggest "United Nations Charter" and "Secretary of UN" as well as corresponding resource locations.

In some implementations, the tables 200 and 250 can be resident on a server device, such as a search engine server. In these implementations, the server device can perform all of the operations in the IME address environment 101, or a portion thereof. For example, the browser on the client device can perform basic IME functions, such as converting Pinyin inputs to candidate character sets 106. The candidate character sets 106 can be provided the server device, which can, in turn, provide the candidate sets of resource locations 108 and keywords 112 back to the client device for display in the IME address environment 101.

Figure 3:
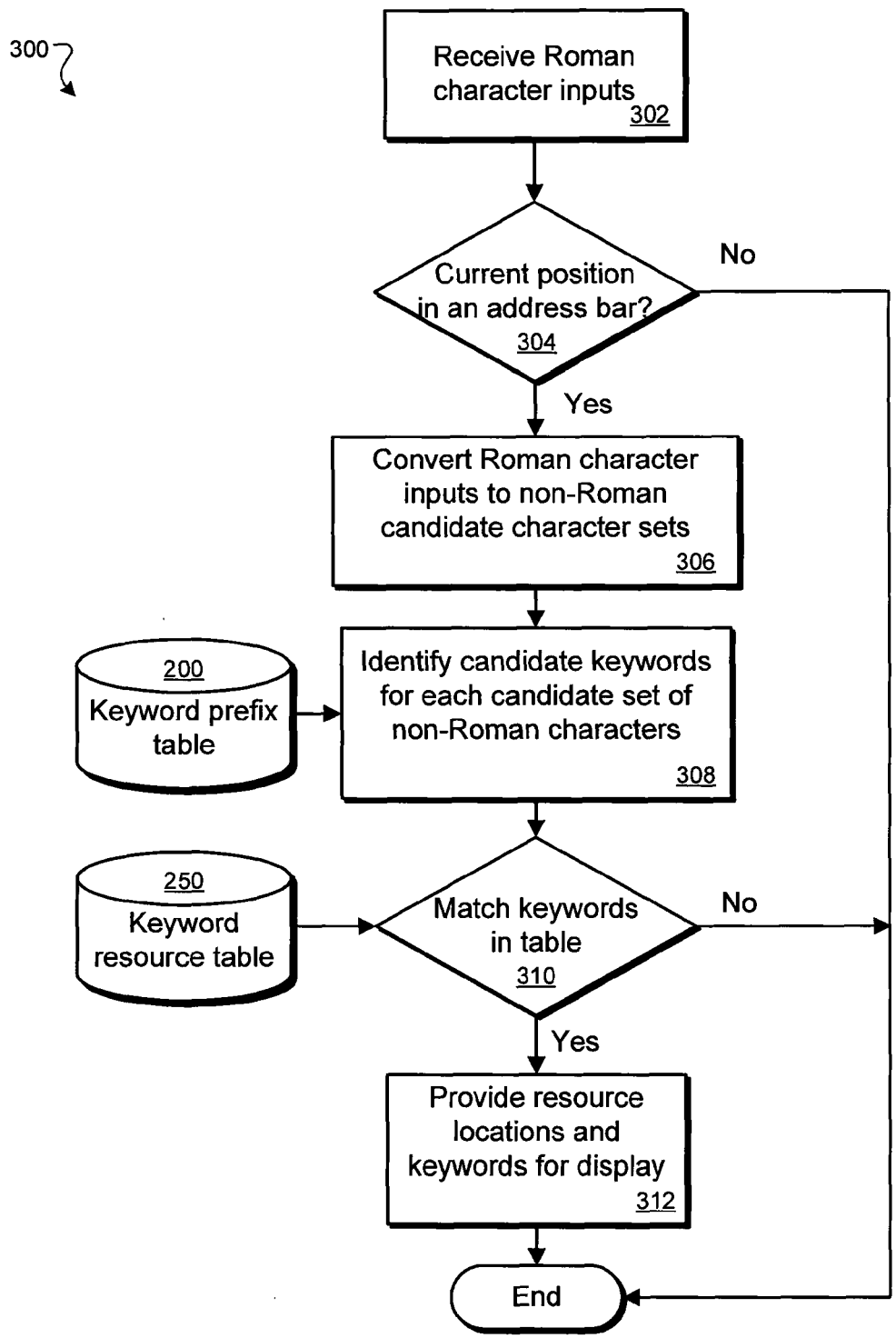
FIG. 3 is a flow diagram of an example process for providing selectable resource locations.

FIG. 3 is a flow diagram of an example process 300 for providing selectable resource locations. The process 300 can be implemented, for example, in device 502 and/or device 504 described in FIG. 5.

The process 300 receives Roman character inputs, such as ASCII string (302). For example, the IME address environment 101 includes the IME address bar 102 that can receive Roman character inputs. In one example, a user can input a Pinyin representation of a Chinese word in the address bar 102 displayed on the device 504. For example, the user can input the term "ping" in IME address bar 102. The term "ping" is a Pinyin representation of the term "apple." In some implementations, the Pinyin representation "ping" may be a keyword prefix. For example, "ping" may be a prefix for the term "apple pie." In general, the Roman characters "ping" representing "apple" can be inputted from a keyboard, such as a Western-style keyboard or a stylus used with a handwriting recognition engine, for example.

The process 300 determines if the input is received in an address bar (304). For example, the device 504 can determine whether the Roman character input (i.e., the keyword prefix) was placed in a URL bar, a search bar, a text editor, or other program. If the input was not entered into the URL bar (e.g., IME address bar 102), the process 300 ends and the entered text is processed by the intended program.

If the keyword prefix was entered into the URL bar, the process 300 uses the Roman character input to identify candidate sets of non-Roman characters (306). For example, the process 300 can include an input method editor process that converts the Roman character input from Pinyin to Chinese (e.g., Hanzi characters). The IME process can be implemented at either the server device 502 or the client device 504.

Upon converting the Roman characters into non-Roman characters, the process 300 identifies candidate sets of resource locations that correspond to the candidate sets of non-Roman characters (308). For example, the process 300 identifies keywords for each set of non-Roman characters by identifying keywords in the keyword prefix table 200 that share the same non-Roman keyword prefix. The identification of keywords can be implemented at either the server device 502 or the client device 504.

The process 300 identifies an associated resource location (e.g., a URL) and matches this resource location with the candidate set of non-Roman characters (310). For example, the process 300 uses the keywords identified from the keyword prefix table 200 as an index to the keyword resource table 250 to identify associated resource locations. The identification of associated resource location can be implemented at either the server device 502 or the client device 504.

If resource locations are not found, the process 300 ends. If resource locations are found, then the process 300 provides the candidate sets of resource locations and the candidate sets of non-Roman characters to a user interface for display (312). For example, if the resource locations are identified at the server device 502, the server device can provide the resource locations and associated keywords to the client device 504. Upon receiving the associated keywords and resource locations, or if the resource locations and keywords are identified at the client device 504, the keywords and resource locations can be provided to a display interface, such as a web browser interface. Thereafter, the process 300 displays the resource locations 108 and corresponding keywords 112 in response to selection of a candidate character set.

In some implementations, the resource locations can be ranked according to selection frequencies. In some implementations, the highest ranked URL for each keyword can be selected and associated with the candidate set of non-Roman characters.

Figure 4:
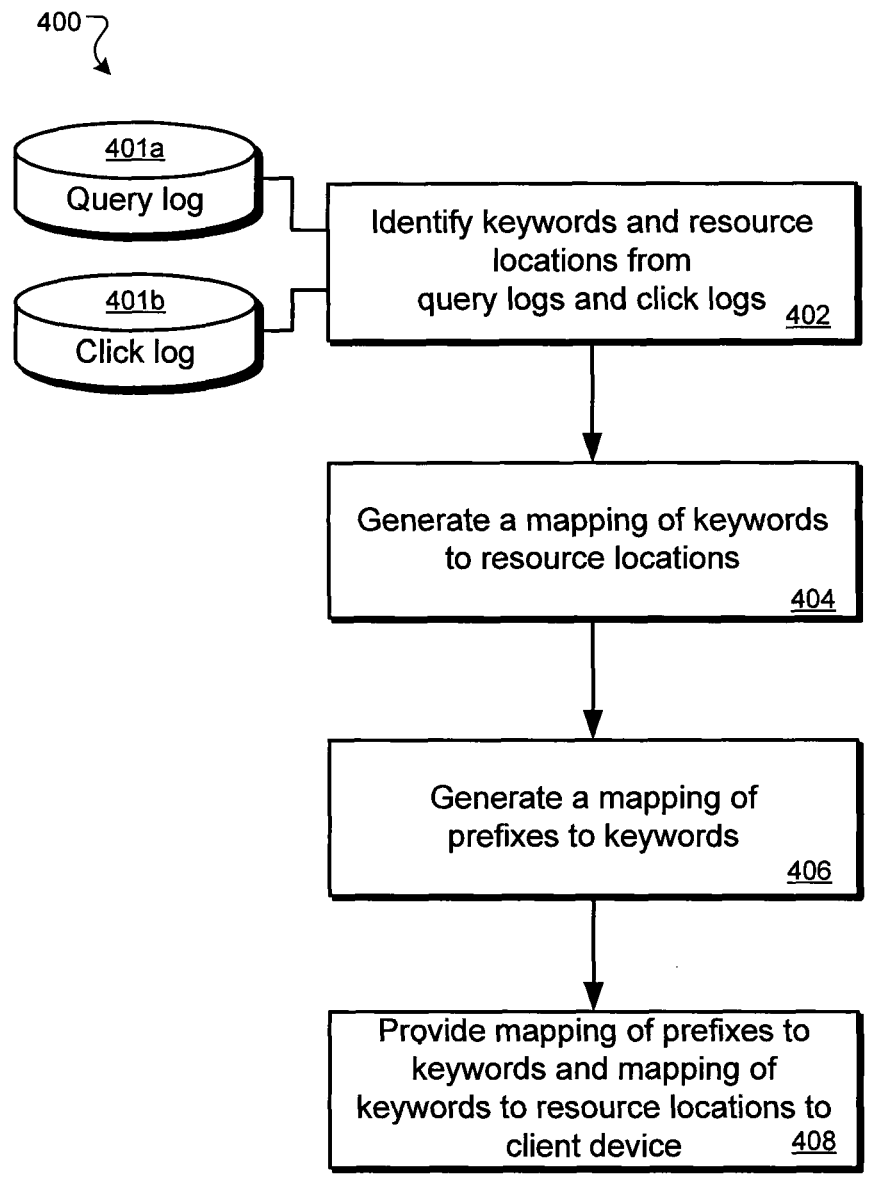
FIG. 4 is a flow diagram of an example process for resolving resource location addresses.

FIG. 4 is a flow diagram of an example process 400 for resolving resource location addresses. The process 400 can be implemented, for example, in the device 502 described in FIG. 5.

The process 400 identifies keywords and resources locations from queries in a query log 401a and selected resource locations identified in a click log 401b. For example, the query log 401a, which stores queries from many users, and the click log 401b, which stores selections of resources locations and corresponding queries for which the resource locations were identified, can be minded by a data-mining engine on the server device 502.

The process 400 can generate a mapping of the keywords to resource locations (404). In some implementations, each resource location represents a location that was selected by a user in response to an entered search query that included the keyword. The mapping can be stored in a database (e.g., keyword resource table 250). In some implementations, mapping keywords can include ranking each resource location for each keyword relative to other resource locations for that keyword. In some implementations, the ranking can be based on the number of times each of the respective resource locations has been selected. Other ranking metrics can also be used. Than mapping can be generated by the data mining engine in the server device 502, and stored in a keyword resource table 250.

The process 400 can generate a mapping of prefixes to keywords (406). For example, the data mining engine in the server device 502 can use query logs 401 to generate a prefix tree that includes each keyword or prefixes thereof. Each node in the prefix tree may correspond to a keyword or a prefix common to multiple keywords. Example nodes in the prefix table 200 include the nodes defined by the columns 202 and 204. This information can be stored in the keyword prefix table 200. In some implementations, a proper subset of the keywords from the query log 401a can be stored in the keyword prefix table 200, such as only keywords that are used in excess of a number of times during a time period.

The process 400 can provide the mapping of prefixes to keywords and the mapping of the keywords to resource locations to a client device (408). For example, the server device 502 can provide the keyword prefix table 200 and the keyword location table 250 to a client device 502.

Figure 5:
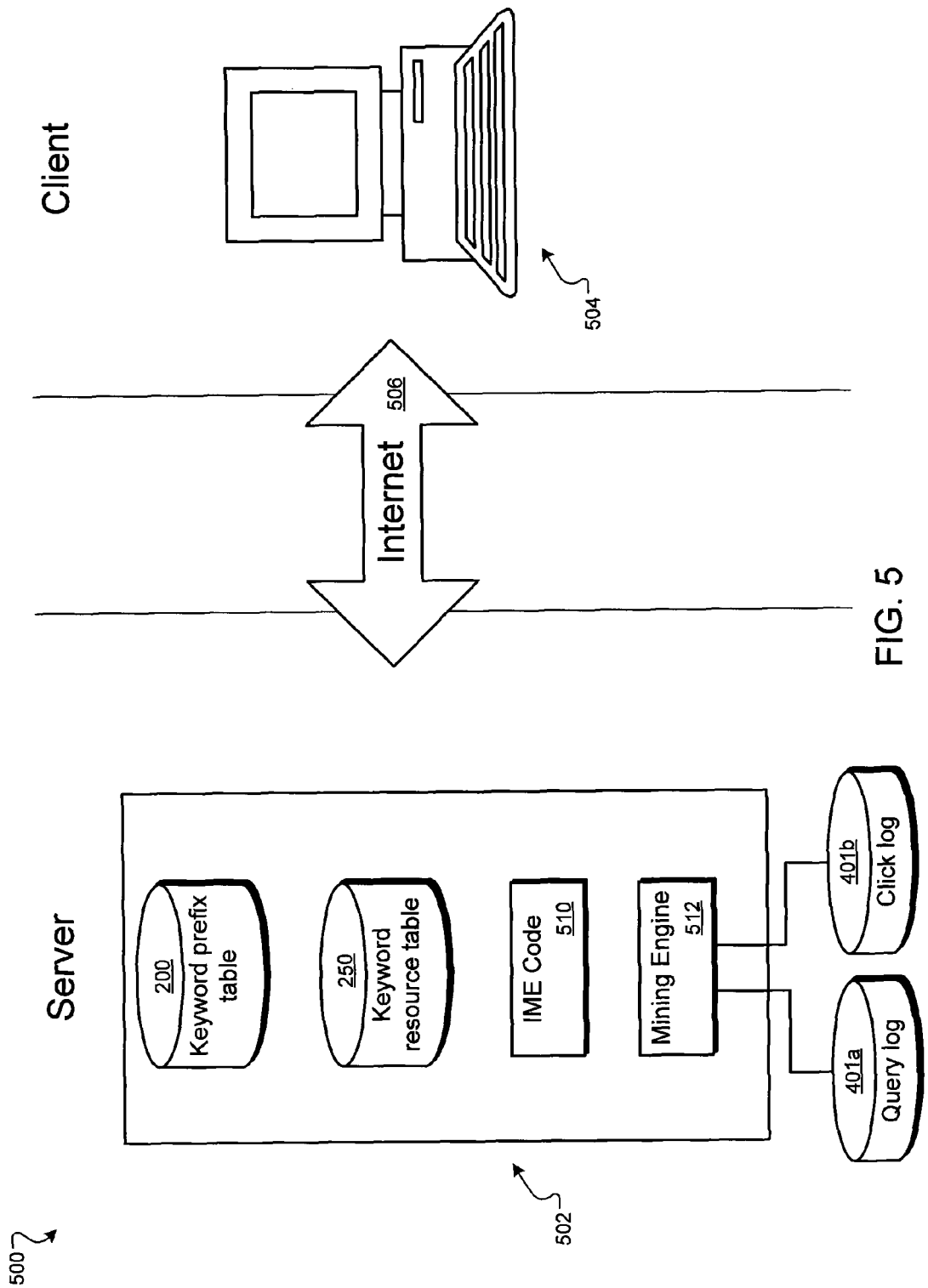
FIG. 5 is a block diagram of an example system that can implement the methods described herein.

FIG. 5 is a block diagram of an example system 500 that can implement the methods described herein. The system 500 includes a server processing device 502 in data communication with a client processing device 504 across internet connection 506. Although only one client and one server are illustrated in FIG. 5, any number of servers and/or clients can be included.

The server 502 includes input method editor code 510 that is executable by the client device 504 and that can be provided to the client device 504. Upon execution by the client device 504, the input method editor code 510 instantiates the IME address environment 101 on the client device 504. The input method editor code 510 can include a language model (not shown) for processing Roman inputs, e.g., Pinyin inputs, and converting the Roman inputs into non-Roman inputs.

The server 502 also includes the keyword prefix table 200 and the keyword resource table 250 as described in FIGS. 2A and 2B above. Other storage architectures can also be used. These tables 200 and 250 can be provided to the client device.

The server 502 also includes a mining engine 514 that can mine query logs 401a and click logs 401b to generate the keyword prefix table 200 and the keyword resource table 250. In some implementations, the mining engine 514 can be configured to identify keywords that exceed a frequency threshold, e.g., keywords that are used in excess of a minimum number of times during a period so as to exclude infrequency or rarely used keywords. This selection process reduces the size of the keyword prefix table 200 by omitting keywords that are unlikely to input or selected by users. Other selection criteria can also be used.

In some implementations, the mining engine 514 can be further configured to identify resources, e.g., web sites, that are selected in excess of frequency threshold, e.g., resource locations that are selected at least a minimum number of times when a keyword is used in a query. This selection process reduces the size of the keyword resource table 250 by omitting resource locations that are unlikely to be selected by users. Other selection criteria can also be used.

The keyword resource table 250 can include initial rankings when provided to the client device 504. These initial rankings are reflective of selection probabilities resulting from the query log 401a and click log 401b. In some implementations, the IME code 514 can track user selections on the client device 504 and adjust the rankings in the keyword resource table 250 that is stored on the client device 504. Thus, the identification of keywords and resource locations can be customized for each user based on each user's browsing history.

Although described in the context of particular language and input method examples, the systems and methods described herein can be used for any language that utilizes ideographic writing. For example, the systems and methods described herein can be used for many other languages that include ideograms, such as the Japanese language.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "processing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving Roman character inputs representing at least one word of a uniform resource locator for a desired webpage,
   using the Roman character inputs to determine candidate sets of non-Roman characters;
   determining candidate sets of uniform resource locators, each candidate set of uniform resource locators associated with a corresponding candidate set of non-Roman characters, wherein determining candidate sets of uniform resource locators includes, for each candidate set of non-Roman characters:
   determining sets of keywords that have the candidate set of non-Roman characters as a prefix by conducting a prefix keyword search using the determined candidate set of non-Roman characters as the prefix to expand the prefix into the determined sets of keywords such that at least one set of the determined sets of keywords includes a greater number of words than the prefix,
   for each determined set of keywords, conducting another search to determine a set of associated uniform resource locators, and
   associating the candidate set of uniform resource locators with the candidate set of non-Roman characters; and
   providing the candidate sets of uniform resource locators and candidate sets of non-Roman characters to the user interface for display, wherein each candidate set of uniform resource locators is displayed in association with a respective corresponding candidate set of non-Roman characters.

2. The method of claim 1, further comprising:
   receiving a selection of one of the candidate sets of non-Roman characters; and
   in response to receiving the selection, displaying the candidate set of uniform resource locators associated with the candidate set of non-Roman characters.

3. The method of claim 1, wherein the non-Roman characters are Hanzi characters.

4. The method of claim 1, wherein determining candidate sets of uniform resource locators further includes, for each of the candidate sets of non-Roman characters:
   searching a prefix table with the candidate set of non-Roman characters to determine keywords, the prefix table mapping keywords to prefixes in non-Roman characters;
   searching a keyword table with the determined sets of keywords to determine uniform resource locators, the keyword table mapping the sets of keywords to uniform resource locators; and
   associating the determined uniform resource locators with the candidate set of non-Roman characters.

5. The method of claim 4, wherein:
   searching a keyword table with the determined sets of keywords to determine uniform resource locators comprises, for each determined set of keywords:
   determining uniform resource locators mapped to the determined set of keywords;
   determining a ranking of each uniform resource locator mapped to the determined set of keywords; and
   selecting the uniform resource locator with the highest ranking; and
   associating the determined uniform resource locator with the candidate set of non-Roman characters comprises associating only the highest ranked uniform resource locator for each set of keywords with the candidate set of non-Roman characters.

6. The method of claim 5, further comprising:
   tracking a number of times each of the uniform resource locator in each of the candidate sets of uniform resource locators is selected; and
   adjusting the ranking of each uniform resource locator based on the number of times each of the uniform resource locators is selected.

7. The method of claim 1, further comprising, for each candidate set of uniform resource locators:
   tracking a number of times each of the uniform resource locators in each of the candidate sets of uniform resource locators is selected; and
   ranking the uniform resource locators in each of the candidate sets of uniform resource locators relative to the other uniform resource locators in the candidate sets of uniform resource locators based on the number of times each of the uniform resource locators has been selected.

8. The method of claim 1, further comprising:
   displaying each of the candidate sets of non-Roman characters on the user interface;
   receiving a selection of one of the candidate sets of non-Roman characters; and
   displaying only the candidate set of uniform resource locators and sets of keywords associated with the selected one of the candidate sets of non-Roman characters.

9. The method of claim 1, wherein providing the candidate sets of uniform resource locators and the candidate sets of non-Roman characters to a user interface for display comprises transmitting the candidate sets of uniform resource locators and the candidate sets of non-Roman characters to a user device that includes the user interface.

10. A computer-implemented method, comprising:
    receiving Roman character inputs representing at least one word of a uniform resource locator for a desired webpage;
    using the Roman character inputs to determine candidate sets of non-Roman characters;
    conducting a search to determine keywords from queries stored in a query log using the candidate sets of non-Roman characters as prefixes, each determined keyword including a corresponding prefix;
    generating a mapping of the prefixes to the determined keywords;
    for each of the determined keywords, conducting another search to determine associated uniform resource locators;
    generating a mapping of the determined keywords to the uniform resource locators, each uniform resource locator being a locator that was selected at least a threshold number of times in response to one or more stored queries that included the keywords to which the uniform resource locator is mapped; and
    providing the mapping of prefixes to keywords and the mapping of the keywords to uniform resource locators to a client device for use in resolving uniform resource locator addresses at the client device.

11. The method of claim 10, wherein generating a mapping of prefixes to keywords comprises generating a prefix tree for the keywords, each node in the prefix tree corresponding to a keyword or a prefix common to multiple keywords.

12. The method of claim 11, wherein each keyword comprises one or more Hanzi characters.

13. The method of claim 12, wherein generating a mapping of the keywords to uniform resource locators comprises ranking each uniform resource locator for each keyword relative to the other uniform resource locator for the keyword based on the number of times each of the uniform resource locators has been selected.

14. A computer program product tangibly embedded in a machine-readable storage device, the computer program product including instructions that, when read by a machine, cause a data processing apparatus to perform operations comprising:
    receiving Roman character inputs representing at least one word of a uniform resource locator for a desired webpage;
    using the Roman character inputs to determine candidate sets of non-Roman characters;
    determining candidate sets of uniform resource locators, each candidate set of uniform resource locators associated with a corresponding candidate set of non-Roman characters, wherein determining candidate sets of uniform resource locators includes, for each candidate set of non-Roman characters:
       determining sets of keywords that have the candidate set of non-Roman characters as a prefix by conducting a prefix keyword search using the determined candidate set of non-Roman characters as the prefix to expand the prefix into the determined sets of keywords such that at least one set of the determined sets of keywords includes a greater number of words than the prefix,
       for each determined set of keywords, conducting another search to determine a set of associated uniform resource locators, and
       associating the candidate set of uniform resource locators with the candidate set of non-Roman characters; and
    providing the candidate sets of uniform resource locators and candidate sets of non-Roman characters to the user interface for display, wherein each candidate set of uniform resource locators is displayed in association with a respective corresponding candidate set of non-Roman characters.

15. The computer program product of claim 14, the operations further comprising:
    receiving a selection of one of the candidate sets of non-Roman characters; and
    in response to receiving the selection, displaying the candidate set of uniform resource locators associated with the candidate set of non-Roman characters.

16. The computer program product of claim 14, wherein the non-Roman characters are Hanzi characters.

17. The computer program product of claim 14, wherein determining candidate sets of uniform resource locators further comprises, for each of the candidate sets of non-Roman characters:
    searching a prefix table with the candidate set of non-Roman characters to determine keywords, the prefix table mapping keywords to prefixes in non-Roman characters;
    searching a keyword table with the determined sets of keywords to determine uniform resource locators, the keyword table mapping sets of keywords to uniform resource locators; and
    associating the determined uniform resource locators with the candidate set of non-Roman characters.

18. The computer program product of claim 17, wherein:
    searching a keyword table with the determined sets of keywords to determine uniform resource locators comprises, for each identified keyword:
       determining uniform resource locators mapped to the determined set of keywords;
       determining a ranking of each uniform resource locator mapped to the determined set of keywords; and
       selecting the uniform resource locator with the highest ranking; and
    associating the identified uniform resource locators with the candidate set of non-Roman characters comprises associating only the highest ranked uniform resource locator for each determined set of keywords with the candidate set of non-Roman characters.

19. The computer program product of claim 18, the operations further comprising:

tracking a number of times each of the uniform resource locators in each of the candidate sets of uniform resource locators is selected; and adjusting the ranking of each uniform resource locator based on the number of times each of the uniform resource locators is selected.

* * * * *